United States Patent [19]

Hiroshima

[11] Patent Number: 5,428,633
[45] Date of Patent: Jun. 27, 1995

[54] HE-NE LASER DRIVING POWER SUPPLY WITH MEANS FOR INTERRUPTING FEEDBACK CONTROL AT DRIVING START OF THE LASER

[75] Inventor: Masaaki Hiroshima, Tokyo, Japan

[73] Assignee: NEC Corporation, Tokyo, Japan

[21] Appl. No.: 28,111

[22] Filed: Mar. 9, 1993

[30] Foreign Application Priority Data

Mar. 9, 1992 [JP] Japan .................. 4-050227

[51] Int. Cl.$^6$ ............................... H01S 3/00
[52] U.S. Cl. .................. 372/38; 315/225; 315/307; 315/219
[58] Field of Search ........... 315/205, 127, 119, 291, 315/219, 225, 360, DIG. 7, 206, 307; 372/38

[56] References Cited

U.S. PATENT DOCUMENTS

| 4,716,569 | 12/1987 | Bees ............................. 372/38 |
| 4,884,280 | 11/1989 | Kinoshita ..................... 372/38 |
| 5,048,033 | 9/1991 | Donahue ....................... 372/38 |
| 5,150,372 | 9/1992 | Nourrcier ...................... 372/38 |

FOREIGN PATENT DOCUMENTS

| 0191482 | 11/1983 | Japan .......................... 372/38 |
| 4155798 | 5/1992 | Japan .......................... 315/206 |
| 4337294 | 11/1992 | Japan .......................... 315/360 |

Primary Examiner—Robert J. Pascal
Assistant Examiner—Arnold Kinkead
Attorney, Agent, or Firm—Sughrue, Mion, Zinn, Macpeak & Seas

[57] ABSTRACT

An electronic circuit is provided to improve the performance of a conventional power supply for driving a He-Ne laser. In order to avoid an undershoot of the DC current due to operation of the feedback circuit at driving start of the laser, a feedback interrupting circuit is provided in the power supply which compares a detected voltage with a first reference voltage smaller than a predetermined voltage to produce a resultant voltage when the detected voltage is larger than the first reference voltage. The resultant voltage is charged at a charging circuit with a charging time constant to produce a charged voltage. The charged voltage is compared with a second reference voltage having a predetermined voltage level, and the feedback circuit is prevented from producing the control signal during the time interval when the charged voltage is smaller than the second reference voltage.

3 Claims, 3 Drawing Sheets

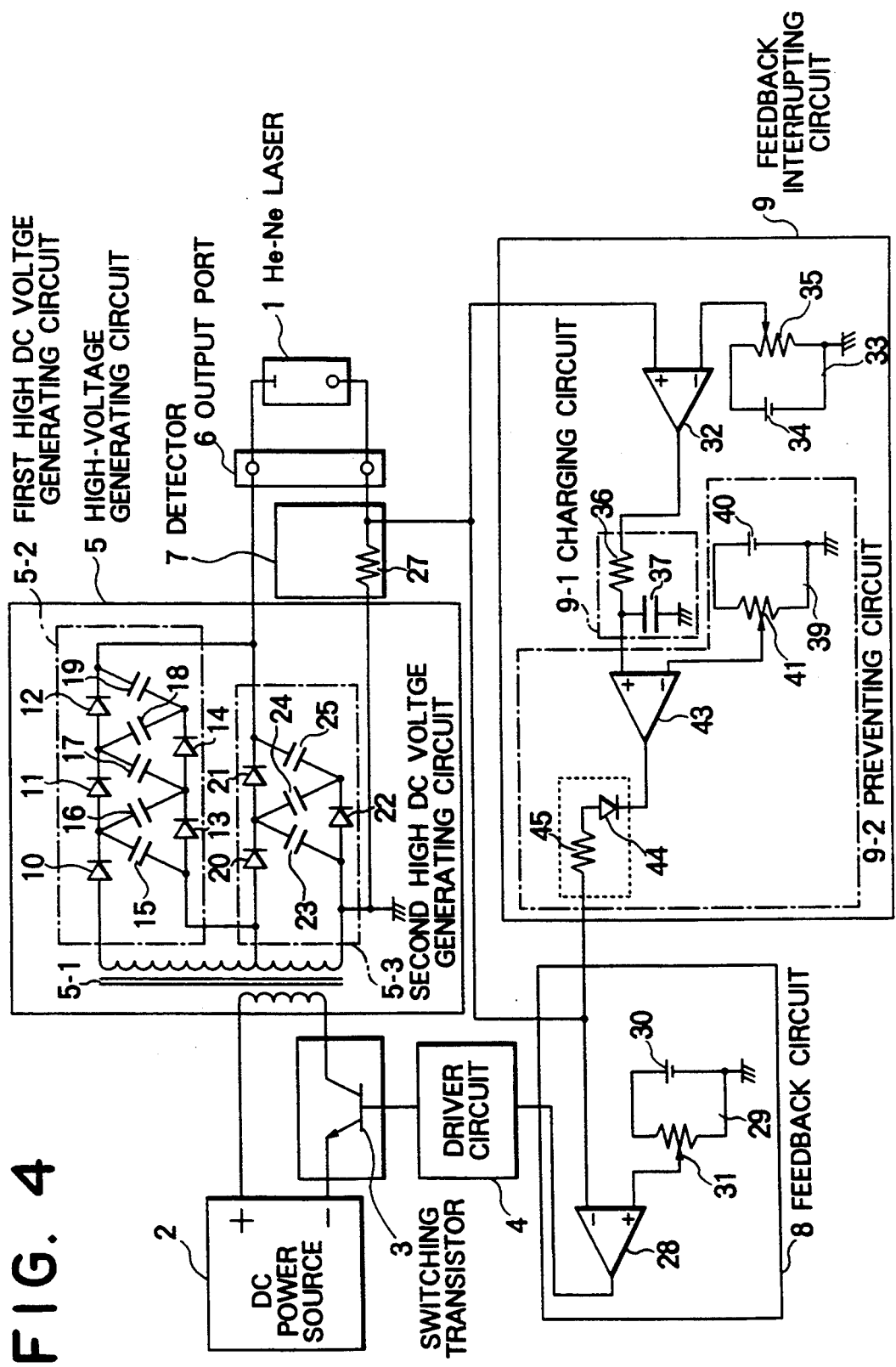

HE-NE LASER DRIVING POWER SUPPLY WITH MEANS FOR INTERRUPTING FEEDBACK CONTROL AT DRIVING START OF THE LASER

BACKGROUND OF THE INVENTION

This invention relates to a power supply for driving a He-Ne laser.

A known power supply of the type comprises a DC power source for generating a DC power with a constant voltage. A switching element is connected to the DC power source and switches the DC power to produce a pulse power having a pulsive voltage waveform repeated with a controllable duty ratio. A driver circuit is connected to the switching element and drives the switching element to make the controllable duty ratio into a predetermined ratio. The driver circuit is responsive to a driver control signal and drives the switching circuit to make the controllable duty ratio into a predetermined reduced duty ratio to reduce the pulse power. A high-voltage generating circuit is connected to the DC power source and the switching circuit and generates, as a high-voltage DC power, a DC power of a high voltage corresponding to the pulse power. An output port is coupled to the high-voltage generating circuit and is for connection of the He-Ne laser tube. The high-voltage DC power is supplied to and drives the He-Ne laser tube connected to the output port. The switching element, the driver circuit, and the high voltage generating circuit form a, so called, DC-DC converter for generating a high voltage DC power from a DC power of a relatively low voltage from the DC power source.

The known power supply further comprises a detector connected between the high-voltage generating circuit and the output port. The detector detects a DC electric current flowing through the He-Ne laser tube connected to the output port to produce a detected voltage signal having a detected voltage level corresponding to the DC electric current. A feedback circuit is connected to the detector and compares the detected voltage signal with a feedback reference voltage having a feedback reference voltage level to produce the driver control signal when the detected voltage level is larger than the feedback reference voltage level.

In the known power supply, the DC current flowing the He-Ne laser is stabilized by the feedback control. That is, when the DC current is increased above a predetermined level corresponding to the feedback reference voltage level, the drive control signal is produced from the feedback circuit, and the pulse power reduced is supplied to the high-voltage generating circuit, so that the high-voltage DC power is reduced in the voltage level. Accordingly, the DC current decreases and becomes the predetermined level or below, the control signal is then stopped so that the pulse power is increased to increase the DC current flowing through the He-Ne laser. Thus, the DC current flowing through the He-Ne laser is stablized constant at the predetermined level.

Discharge or operation of the He-Ne laser is stably maintained by supply of DC power of a high voltage such as several kilo volts after the discharge starts. However, the higher voltage is required to start the discharge. Accordingly, the high-voltage generating circuit in the conventional power supply is provided with two high DC voltage generating circuits, first one for starting the discharge and second one for maintaining the discharge after start. In operation, the higher voltage is at first supplied from the first high DC voltage generating circuit to the He-Ne laser to start discharge. After start of the discharge, the He-Ne laser is lowered in its impedance so that the first high DC voltage generating circuit stops operation and the second high DC voltage generating circuit supplies the high voltage to the He-Ne laser in place of the first high DC voltage generating circuit.

At driving start of the He-Ne laser by the power supply, the higher voltage is applied to the He-Ne laser so as to start discharge of the laser and DC current flowing through the laser is therefore higher than the predetermined level. That is, a, so called, rush current flows through the laser and the detector. Accordingly, the driver control signal is produced by the feedback circuit and the pulse power is therefore reduced so that the DC current suffers from undershoot. That is, the DC current lowers below the predetermined level just after the start of the discharge, so that the discharge unfortunately is stopped.

SUMMARY OF THE INVENTION

It is therefore an object of this invention to provide a power supply for driving a He-Ne laser which enables to avoid an undershoot of the DC current due to operation of the feedback circuit at driving start by the He-Ne laser by the power supply.

According to this invention, there is provided a power supply for driving a He-Ne laser comprising:

DC power source means for generating a DC power with a constant voltage;

switching means connected to the DC power source means 1 for switching the power to produce a pulse power having a pulsive voltage waveform repeated with a controllable duty ratio;

driver means connected to the switching means for driving the switching means to make the controllable duty ratio into a predetermined ratio, the driver means responsive to a driver control signal for driving the switching means to make the controllable duty ratio into a predetermined reduced duty ratio to reduce said pulse power;

high-voltage generating means connected to the DC power source means and the switching means for generating, as a high-voltage DC power, a DC power of a high voltage corresponding to the pulse power;

output port means coupled to said high-voltage generating means and to be connected with the He-Ne laser tube for supplying the high-voltage DC power to and driving the He-Ne laser tube connected to the output port means;

detecting means connected between the high-voltage generating means and the output port means for detecting a DC electric current through the He-Ne laser tube connected to the output port means to produce a detected voltage signal having a detected voltage level corresponding to the DC electric current;

feedback means connected to the detecting means for comparing the detected voltage signal with a feedback reference voltage having a feedback reference voltage level to produce the driver control signal when the detected voltage level is larger than the feedback reference voltage level; and feedback interrupting means connected to the detecting means for comparing the detected voltage signal with a first reference voltage having a first reference voltage level smaller than the feedback reference voltage level to interrupt, for a predetermined time interval, the feedback means from producing the driver control signal when the detected voltage level is larger than the first reference voltage level.

BRIEF DESCRIPTION OF THE DRAWINGS

FIG. 4 is a block diagram view of a He-Ne laser driving power supply according to a second embodiment of the present invention.

DESCRIPTION OF THE PREFERRED EMBODIMENTS

Figure 1:
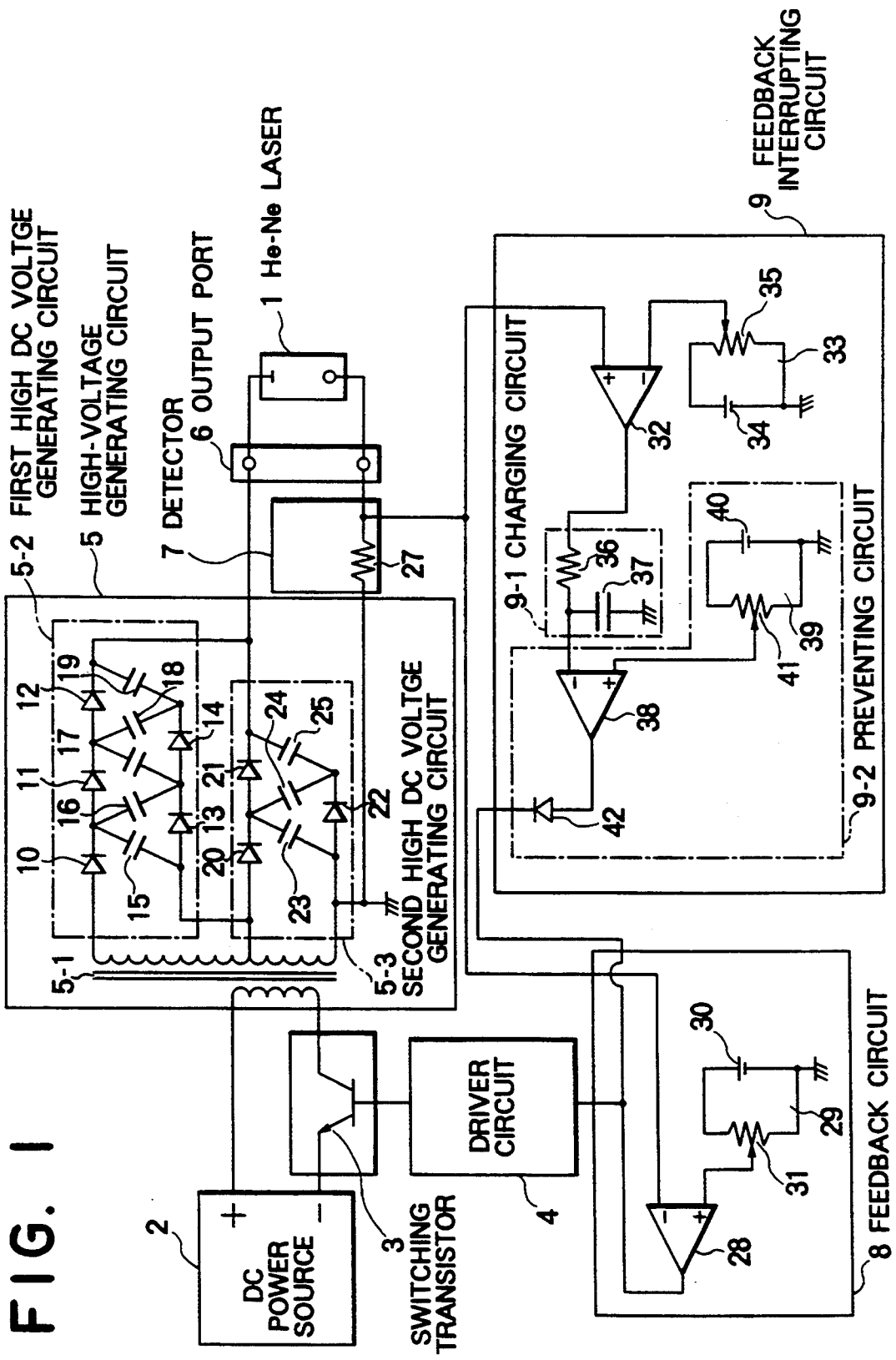
FIG. 1 is a block diagram view of a He-Ne laser driving power supply according to a first embodiment of the present invention.

Referring to FIG. 1, the description will be made as to a power supply for driving a He-Ne laser 1 according to a first embodiment of this invention.

In FIG. 1, a DC power source 2 generates a DC power with a constant voltage. A switching transistor 3 as a switching element is connected to the DC power source 2 and switches the DC power to produce a pulse power having a pulsive voltage waveform repeated with a controllable duty ratio. A driver circuit 4 is connected to the switching transistor 3 and drives the switching transistor 3 to make the controllable duty ratio into a predetermined ratio. The driver circuit 4 responsive to a driver control signal drives the switching transistor 3 to make the controllable duty ratio into a predetermined reduced duty ratio to reduce the pulse power.

In connection with the driver circuit 4, two types are well known in the prior art for reducing the pulse power in response to the driver control signal.

In one type, the driver circuit usually generates a pulse signal with a predetermined pulse frequency and a predetermined pulse duration, that is, the predetermined duty ratio and stops to generate the pulse signal for a time duration when receiving the driver control signal. The switching transistor 3 is usually driven by the pulse signal and switches the DC power to produce a pulse power having a pulsive voltage waveform repeated with the predetermined duty ratio. When the driver circuit receives the driver control signal, the driver maintains the switching transistor in OFF condition, so that the controllable duty ratio is made into zero as the predetermined reduced duty ratio and the pulse power is therefore reduced to zero.

In another type, the driver circuit usually generates a first pulse signal with a predetermined pulse frequency and a predetermined first pulse duration, that is, the predetermined duty ratio and generates a second pulse signal with the predetermined pulse frequency and a predetermined second pulse duration smaller than the first pulse duration, that is, a second duty ratio as the predetermined reduced duty ratio for a time duration when receiving the driver control signal. The switching transistor is usually driven by the first pulse signal and switches the DC power to produce a pulse power having a pulsive voltage waveform repeated with the predetermined duty ratio. When the driver circuit receives the driver control signal, the driver circuit generates the second pulse signal in place of the first pulse signal. Then, the switching transistor is driven by the second pulse signal and switches the DC power to produce the pulse power having the pulsive voltage waveform repeated but having the second duty ratio. Thus, the pulse power is reduced in response to the driver control signal.

In the embodiment of the present invention, any one of the two types can be used as the driver circuit 4.

A high-voltage generating circuit 5 is connected to the DC power source 2 through the switching transistor 3. In detail, the high-voltage generating circuit 5 comprises a transformer 5-1 having a primary winding connected to the DC power source 2 through the switching transistor 3 and a secondary winding. When the pulse power is applied to the primary winding, the pulse power is produced on the second winding with an elevated voltage. The secondary winding has two output terminals on which different voltages are generated.

To the two output terminals, a first and a second high DC voltage generating circuits 5-2 and 5-3 are connected for generating DC voltage with different magnitudes, respectively. The first high DC voltage generating circuit 5-2 produces DC voltage higher than that of the second high DC voltage generating circuit 5-3.

The first high DC voltage generating circuit 5-2 comprises five diodes 10 through 14 and five capacitors 15 through 19 which are connected to each other as shown in the figure. The first high DC voltage generating circuit 5-2 is used for starting the discharge of the He-Ne laser 1 at driving start of the He-Ne laser 1 by the power supply.

The second high DC voltage generating circuit 5-3 comprises three diodes 20 through 22 and three capacitors 23 through 25 which are connected to each other as shown in the figure. The second high DC voltage generating circuit 5-3 is used for maintaining the discharge after start.

An output port 6 is coupled to the high-voltage generating circuit 5. The first and the second high DC voltage generating circuits 5-2 and 5-3 are commonly connected to the output port 6. The He-Ne laser 1 is connected to the output port 6 so as to be supplied with the high-voltage DC power.

A detector 7 is connected between the high-voltage generating circuit 5 and the output port 6. The detector 7 usually comprises a resistor 27 and detects the DC electric current flowing through the He-Ne laser tube 26 to produce a detected voltage signal having a detected voltage level corresponding to the DC electric current.

A feedback circuit 8 is connected to the detector 7 and comprises a feedback comparator 28 and a feedback reference voltage generator 29. The feedback comparator 28 has an inverting input terminal (−) connected to the detector 7, a non-inverting input terminal (+) connected to the feedback reference voltage generator 29, and an output terminal. The feedback reference voltage generator 29 comprises a reference voltage source 30 and a reference variable resistor 31 to produce a feedback reference voltage having a feedback reference voltage level. The reference variable resistor 31 is for adjusting the feedback reference voltage to the level which is equal to the detected voltage level corresponding to a predetermined level of the DC current sufficient to maintain the discharge of the He-Ne laser 1. The feedback comparator 28 compares the detected voltage signal with the feedback reference voltage to produce the driver control signal on the output terminal when the detected voltage level is larger than the feedback reference voltage level.

In response to the drive control signal, the driver circuit 4 controls the switching transistor 3 to reduce the pulse power. Thus, the DC current is stabilized constant at the predetermined level.

A conventional power supply for driving a He-Ne laser comprises the DC power source 2, the switching transistor 3, the driver circuit 4, the high-voltage generating circuit 5, the detector 7, and the feedback circuit 8 as described above.

Figure 2:
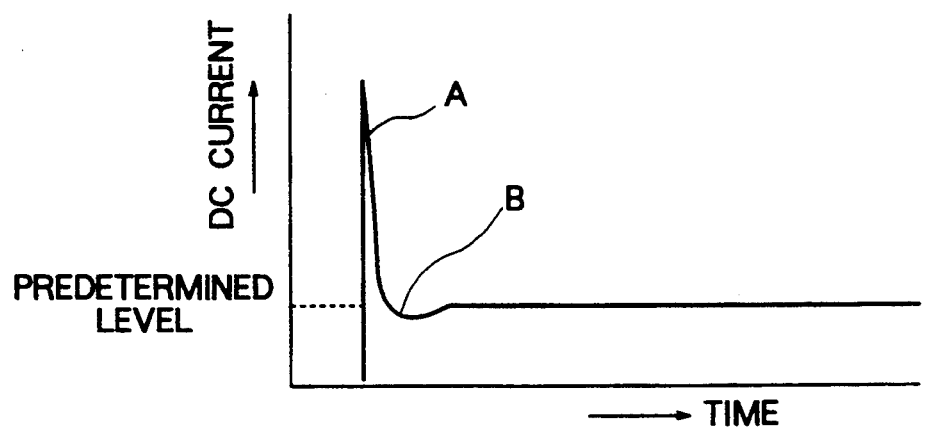
FIG. 2 is a graph for illustrating a changing curve of a DC current flowing through the He-Ne laser driven by a conventional power supply.

Referring to FIG. 2, the description will proceed to the operation of the conventional power supply for driving a He-Ne laser. At driving start of the He-Ne laser 1, the high-voltage DC power is applied to the He-Ne laser 1 from the first high DC voltage generating circuit 5-2, DC current flowing through the He-Ne laser 1 is higher than the predetermined level corresponding to the feedback reference voltage level. Namely, a, so called, rush current A flows through the laser 1 and the detector 7. Accordingly, the driver control signal is produced by the feedback circuit 8 and the pulse power is reduced.

Thereafter, the high-voltage DC power is supplied from the second high DC voltage generating circuit 5-3 in place of the first high DC voltage generating circuit 5-2 after start of the discharge of the laser 1, and the high-voltage DC power is therefore reduced in the voltage level as described in the preamble of the present specification. As a result, the DC current suffers from undershoot B following the rush current. That is, the DC current lowers below the predetermined level just after the start of the discharge, so that the discharge is often stopped disadvantageously.

This invention enables to avoid the undershoot of the DC current.

To this end, the power supply according to this invention is further provided with a feedback interrupting circuit 9 as shown in FIG. 1.

The feedback interrupting circuit 9 comprises a first comparator 32, a first voltage generating circuit 33, a charging circuit 9-1, and a preventing circuit 9-2.

The first voltage generating circuit 33 comprises a first reference voltage source 34 and a first reference variable resistor 35 to produce a first reference voltage having a first reference voltage level smaller than the feedback reference voltage level. The first reference variable resistor 35 is for adjusting the first reference voltage level.

The first comparator 32 compares the detected voltage signal with the first reference voltage to produce a resultant voltage signal when the detected voltage level is larger than the first reference voltage level.

The charging circuit 9-1 comprises a resistor 36 and a capacitor 37 and has a predetermined charging time constant which is determined by a resistance of the resistor 36 and a capacitance of the capacitor 37. The charging circuit 9-1 is coupled to the first comparator 32 and charges the resultant voltage signal to produce a charged voltage.

The preventing circuit 9-2 comprises a second comparator 38, a second voltage generating circuit 39, and a diode 42. The second comparator 38 has an inverting input terminal (−) connected to the charging circuit 9-1, a non-inverting input terminal (+) connected to the second voltage generating circuit, and an output terminal connected to the output terminal of the feedback comparator 28 through the diode 42. The second voltage generating circuit 39 comprises a second reference voltage source 40 and a second reference variable resistor 41 to produce a second reference voltage having a second reference voltage level. The second reference variable resistor 41 is for adjusting the second reference voltage level.

The second comparator 38 compares the charged voltage with the second reference voltage to produce a cancelling signal during a time interval when the charged voltage is smaller than the second reference voltage in voltage level. The time interval is determined by the predetermined charging time constant and the second reference voltage level. The cancelling signal is applied to the output terminal of the second comparator 38 through the diode 42 and cancels the driver control signal to prevent the feedback circuit 8 from producing the driver control signal during the time interval. That is, the feedback circuit 8 is interrupted by the feedback interrupting circuit 9 during the time interval.

Specifically, the cancelling signal has a positive level and cancels the driver control signal having a negative level.

As a result, the driver circuit 4 receives no control signal during the time interval after start of the discharge of the He-Ne laser 1, so that the switching transistor 3 continues to produce the pulse power with the predetermined duty ratio without reduction.

Figure 3:
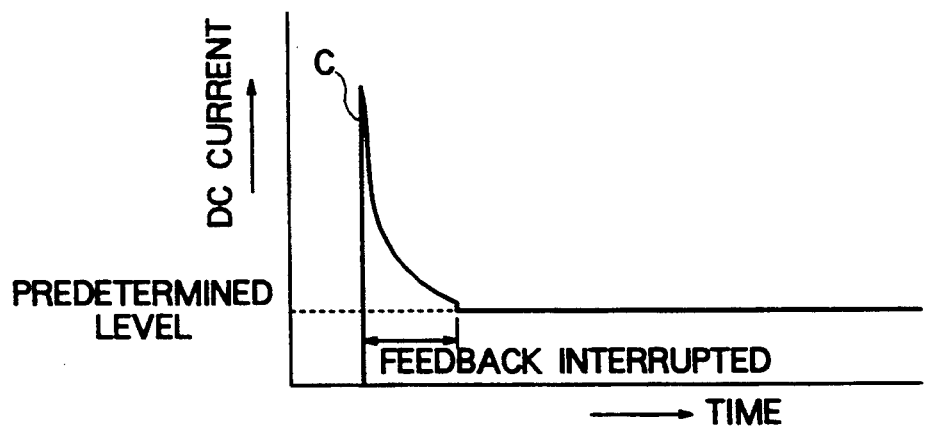
FIG. 3 is a graph for illustrating a changing curve of a DC current flowing through the He-Ne laser driven by the power supply shown in FIG. 1.

Accordingly, even if the rush current C flows through the He-Ne laser 1 and the detector 7 at the driving start as shown in FIG. 3, the pulse power is not reduced for the time interval. Therefore, when the high-voltage DC power is supplied from the second high DC voltage generating circuit 5-3 in place of the first high DC voltage generating circuit 5-2 during the time interval after start of the discharge of the laser 1, the DC current directly decreases to the predetermined level without undershoot following the rush current C, as shown in FIG. 3, although the high-voltage DC power is reduced in the voltage level. Thus, it is avoidable that the discharge stops after start.

Thereafter, the charged voltage in the charging circuit 9-1 is maintained larger than the second reference voltage level so that the cancelling signal is not produced from the feedback interrupting circuit 9. As a result, the DC current is stabilized by the known feedback control.

Referring to FIG. 4, the He-Ne laser driving power supply according to a second embodiment of this invention shown therein is similar in structure to that illustrated in FIG. 1 except for the preventing circuit 9-2. The similar portions are shown by the same reference numerals and description thereto is omitted.

In FIG. 4, the preventing circuit 9-2 comprises a second comparator 43, the second voltage generating circuit 39 similar to that in FIG. 1, a diode 44, and a resistor 45. The second comparator 43 has a non-inverting input terminal (+) connected to the charging circuit 9-1, an inverting input terminal (−) connected to the second voltage generating circuit 39, and an output terminal connected to the inverting input terminal (−) of the feedback comparator 28 and the detector 7 through the diode 44 and the resistor 45. The second comparator 43 compares the charged voltage with the second reference voltage to produce a cancelling signal during the time interval when the charged voltage is smaller than the second reference voltage in voltage level. The cancelling signal is applied to the inverting input terminal of the feedback comparator 28 and cancels the detected voltage signal from the detector 7 to prevent the feedback circuit 7 from producing the driver control signal during the time interval. The resistor 45 is for protecting the second comparator 43 from the detected voltage signal.

Specifically, the cancelling signal has a negative level and the detected voltage signal therefore flows to the output terminal of the second comparator 43 through the resistor 45 and the diode 44. Thus, the detected voltage signal does not flow to the inverting input terminal of the feeding comparator 28. Accordingly, the cancelling signal prevents the feedback circuit 8 from producing the driver control signal having a negative level during the time interval.

Accordingly, the second embodiment of FIG. 4 has an effect similar to that of FIG. 1 in that it is possible to avoid the undershoot of the DC current.

What is claimed is:

1. A power supply for driving a He-Ne laser, comprising:
    DC power source means for generating a DC power with a constant voltage;
    switching means connected to said DC power source means for switching said DC power to produce a pulse power having a pulsive voltage waveform repeated with a controllable duty ratio;
    driver means connected to said switching means for driving said switching means to make said controllable duty ratio into a predetermined ratio, said driver means responsive to a driver control signal for driving said switching means to make said controllable duty ratio into a predetermined reduced duty ratio to reduce said pulse power;
    high-voltage generating means connected to said DC power source means and said switching means for generating, as a high-voltage DC power, a DC power of a high voltage corresponding to said pulse power;
    output port means coupled to said high-voltage generating means and connected with the He-Ne laser tube for supplying said high-voltage DC power to and driving the He-Ne laser tube connected to said output port means;
    detecting means connected between said high-voltage generating means and said output port means for detecting a DC electric current through the He-Ne laser tube connected to said output port means to produce a detected voltage signal having a detected voltage level corresponding to said DC electric current;
    feedback means connected to said detecting means for comparing said detected voltage signal with a feedback reference voltage having a feedback reference voltage level to produce said driver control signal when said detected voltage level is larger than said feedback reference voltage level; and
    feedback interrupting means connected to said detecting means for comparing said detected voltage signal with a first reference voltage having a first reference voltage level smaller than said feedback reference voltage level to interrupt, for a predetermined time interval, said feedback means from producing said driver control signal when said detected voltage level is larger than said first reference voltage level,
    said feedback interrupting means comprising:
    first voltage generating means for generating said first reference voltage;
    first comparator means comparing said detected voltage signal with said first reference voltage to produce a resultant voltage signal when said detected voltage level is larger than said first reference voltage level;
    charging means having a predetermined charging time constant and coupled to said first comparator means for charging said resultant voltage signal to produce a charged voltage; and
    preventing means coupled to said charging means and said feedback means for comparing said charged voltage with a second reference voltage having a predetermined voltage level to prevent said feedback means from producing said driver control signal during a time interval when said charged voltage is smaller than said second reference voltage in voltage level.

2. A power supply for driving a He-Ne laser in claim 1, wherein said feedback means comprises:
    feedback reference voltage generator for producing said feedback reference voltage; and
    feedback comparator, having an inverting input terminal connected to said detecting means, a non-inverting input signal connected to said feedback reference voltage generator, and an output terminal, for comparing said detected voltage signal with said feedback reference voltage in voltage level to produce said driver control signal on said output terminal when said detected voltage level is larger than said feedback reference voltage;
    and wherein said preventing means comprises:
    second voltage generating means for generating said second reference voltage;
    second comparator having an inverting input terminal connected to said charging means and a non-inverting input terminal connected to said second voltage generating means for comparing said charged voltage with said second reference voltage in voltage level to produce a cancelling signal during a time interval when said charged voltage is smaller than said second reference voltage in voltage level; and
    diode means connecting said second comparator with said output terminal of said feedback comparator for cancelling said driver control signal by said cancelling signal to prevent said feedback means from producing said driver control signal.

3. A power supply for driving a He-Ne laser in claim 1, wherein said feedback means comprises:
    feedback reference voltage generator for producing said feedback reference voltage; and
    feedback comparator, having an inverting input terminal connected to said detecting means, a non-inverting input signal connected to said feedback reference voltage generator, and an output terminal, for comparing said detected voltage signal with said feedback reference voltage in voltage level to produce said driver control signal on said output terminal when said detected voltage level is larger than said feedback reference voltage;
    and wherein said preventing means comprises:
    second voltage generating means for generating said second reference voltage;
    second comparator having a non-inverting input terminal connected to said charging means and an inverting input terminal connected to said second voltage generating means for comparing said charged voltage with said second reference voltage in voltage level to produce a cancelling signal during a time interval when said charged voltage is smaller than said second reference voltage in voltage level; and diode means connecting said second comparator with said inverting input terminal of said feedback comparator for cancelling said detected voltage signal by said cancelling signal to prevent said feedback comparator from producing said driver control signal.

* * * * *